United States Patent [19]

Leiber

[11] 4,387,782
[45] Jun. 14, 1983

[54] HYDRAULIC POWER STEERING SYSTEM

[75] Inventor: Heinz Leiber, Leimen, Fed. Rep. of Germany

[73] Assignee: Robert Bosch GmbH, Stuttgart, Fed. Rep. of Germany

[21] Appl. No.: 246,797

[22] Filed: Mar. 23, 1981

Related U.S. Application Data

[63] Continuation-in-part of Ser. No. 62,595, Jul. 31, 1979, abandoned.

[30] Foreign Application Priority Data

Sep. 2, 1978 [DE] Fed. Rep. of Germany ....... 2838417

[51] Int. Cl.³ .............................................. B62D 5/06
[52] U.S. Cl. .................................. 180/132; 180/142; 180/143
[58] Field of Search ................ 180/132, 133, 142, 143

[56] References Cited

U.S. PATENT DOCUMENTS 3,782,781  1/1974  Lewis ................................. 180/133

Primary Examiner—John A. Pekar
Attorney, Agent, or Firm—Edwin E. Greigg

[57] ABSTRACT

A hydraulic power steering for motor vehicles which is provided with both a hydraulic brake system and an anti-lock apparatus. The anti-lock apparatus has a mutliple-position final valve control element and an electronic control device for signal evaluation, including speed signals. The multiple-position final valve control element and the electronic control device are preferably jointly used in predetermined speed ranges for driving the power steering. The hydraulic power steering is primarily intended for use as a means of parking power steering.

7 Claims, 2 Drawing Figures

HYDRAULIC POWER STEERING SYSTEM

CROSS-REFERENCE TO RELATED COPENDING APPLICATION AND BACKGROUND RELATED PRIOR ART

This application is a continuation-in-part application of my application Ser. No. 62,595, filed July 31, 1979 and now abandoned.

The application is an improvement over German Offenlegungsschrift No. 2,352,018 and is discussed below. Cross-reference of interest only is made of Leiber et al U.S. patent application Ser. No. 62,600, filed July 31, 1979.

BRIEF SUMMARY OF THE INVENTION

The present invention is directed to a hydraulic power steering system which makes use of the hydraulic valve control and electronic control systems of a anti-locking brake system already on a vehicle for controlling the brakes. The hydraulic power steering system of this invention is for use only during parking of a vehicle. Therefore, the electronic control and hydraulic control of the power steering system will not interfere with the normal operation of the anti-locking braking system.

BACKGROUND OF THE INVENTION

The general art of power steering systems is known but the particular adaptation of specific controls responsive to selected ones of various quantities such as speed signals is not known to the extent of applying it a kind of parking power steering system of the specific arrangements herein disclosed in this new and improved arrangement.

Power steering means which function in accordance with the so-called revolving principle are very widespread. These very sensitive power steering means operate over the entire speed range. They have a hydraulic circuit of their own, which has recently, however, also been used together with a reservoir charging valve and a hydraulic reservoir for operating a hydraulic brake force amplifier. In the brake force amplifier itself, there is then a separation of the media of the hydraulic circuits. In the brake circuit itself, a fluid which meets the requirements of the brake system is used. There are also isolated examples of vehicles which have a so-called central hydraulic system, in which one medium is used both for the power steering and the regulation of the level, as well as for the brakes. In this case, however, the brake circuit is embodied not as a closed circuit but rather as open or even dynamic brake circuit. In a conception of this kind, the fluid must be able to meet strict requirements pertaining to lubricating capacity, because the hydraulic pump runs continuously and supplies the system noted above.

The types of power steering systems which have been known until the present invention usually have a degree of reinforcement which is independent of speed, which is well-known to be disadvantageous. Recently, both in the literature (German Offenlegungsschrift No. 2,352,018) and in isolated production instances, control devices in power steering apparatus have become known which reduce the degree of reinforcement at higher speeds or even cause the power steering mechanism to be effective only at parking speeds. Usually, the engine rpm is used as an auxiliary value for the control means. Power steering means are also known, which are effective only at parking speeds, but whose servo force is derived from an electromotor. These "electromotor power steering" means also use auxiliary signals which restrict the functional range of the power steering. For instance, relay circuits or even electronic circuits are used which control the rotary direction of the engine and shut off the function above a predetermined speed. In some instances, the gear setting or an appropriate final switch is used as a transducer. In consideration of the tendency in automobile design to reduce the weight of the vehicles in the future, which makes the introduction of parking power steering necessary in response to rising comfort standards, still the above-noted means of providing power steering mechanisms require relatively great structural expense and increase the weight of the vehicle.

OBJECT AND SUMMARY OF THE INVENTION

The power steering system in accordance with the invention as disclosed in this application has the advantage over the prior art that as a result of jointly using anti-locking braking functions, the expense for the inclusion of a power steering system is particularly low in cost. In the most favorable case, the power steering system is restricted to the incorporation of a transducer (in the steering column, for example) and to a placement cylinder, which may under some circumstances be embodied as a modified steering damper. It is particularly advantageous to jointly use the extensive safety circuitry of the electronic control device of the anti-lock brake system. In addition, it is noted that in the lower speed range described (5 km/hr, for example) in which a parking power steering is intended to function, the anti-locking brake function is not required. As a result, both electronics and the energy supply and, as needed, the multiple-position valve may be jointly used without disadvantage to the anti-lock brake system. It is additionally noted that electronic systems in the motor vehicle will in the future have a so-called computer structure, similar to or identical with microprocessors, in which, by triggering a predetermined program, functions of many different kinds can be realized.

Further advantages are:

The double utilization of the hydraulic energy supply for the operation of a brake force amplifier of the auxiliary force type and operation of an electrohydraulic power steering means.

The use of the same medium for the brake system, brake force amplification, and power steering.

The use of a single electronic control device for triggering the multiple-position final value control element, which controls the hydraulic fluid.

The invention will be better understood as well as further objects and advantages thereof become more apparent from the ensuing detailed description of a preferred embodiment taken in conjunction with the drawing.

DESCRIPTION OF THE PREFERRED EMBODIMENT

Figure 1:
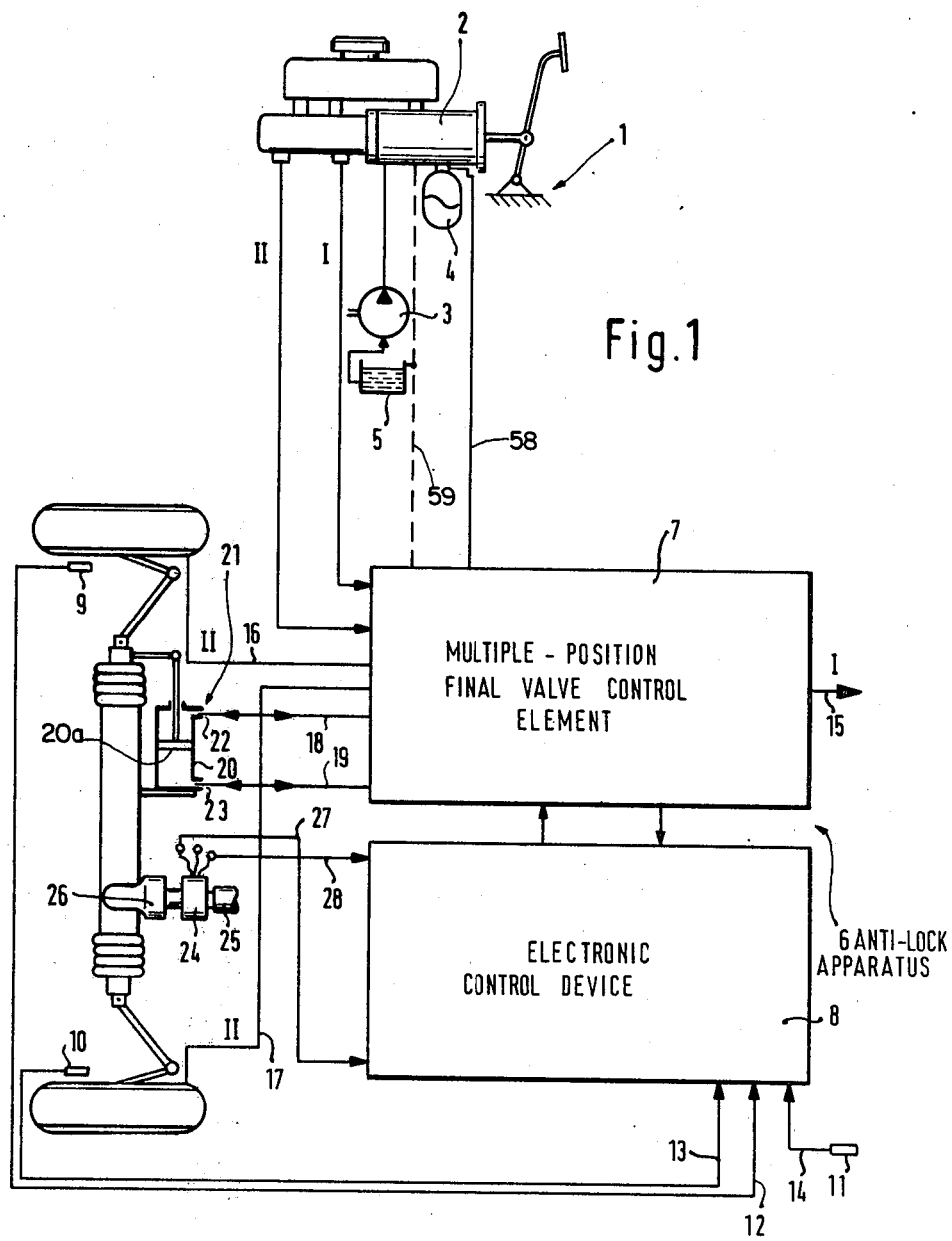
FIG. 1 shows schematically the overall system for hydraulic power steering which is incorporated with a brake system having an anti-lock means.

Turning now to the drawings, there is shown a hydraulic brake system 1 which has a two-circuit brake force amplifier 2 that is also connected to a pump 3, a storage means 4 and a reservoir 5. The brake system 1 is also equipped with an anti-lock brake apparatus 6, which has a multiple-position final valve control element 7 and an electronic control device 8 for the evaluation of various electronic control signals. Thus, as an example, speed signals are picked up at the wheels by sensors 9, 10, 11 and delivered via lines 12, 13, 14 to control device 8. Three brake lines 15, 16, 17 of the brake circuits I and II run from the multiple-position final valve control element 7 and connect with the wheel brake cylinders for operation of the front and back brakes as well known in the art. Also attached to the final valve control element 7 are two fluid flow lines 18 and 19, which lead to opposite sides of a piston 20a in an operating cylinder 20 of a power steering apparatus 21. The operating cylinder 20 is a modified steering damper, modified, among other ways, in that it has two line connections 22 and 23 for the lines 18 and 19, respectively.

A transducer 24 is mounted in the power steering mechanism, which is indicated generally as 21, and in this exemplary embodiment it is disposed on a steering column 25. However, it can also be provided on a steering gear 26 as well. The transducer 24 is connected via two electrical lines 27 and 28 to the electronic control device 8 of the anti-lock brake apparatus 6. The transducer 24 is of any well known type that sends a signal depending upon the direction of rotation of the steering column which functions to produce the electrical signal.

Figure 2:
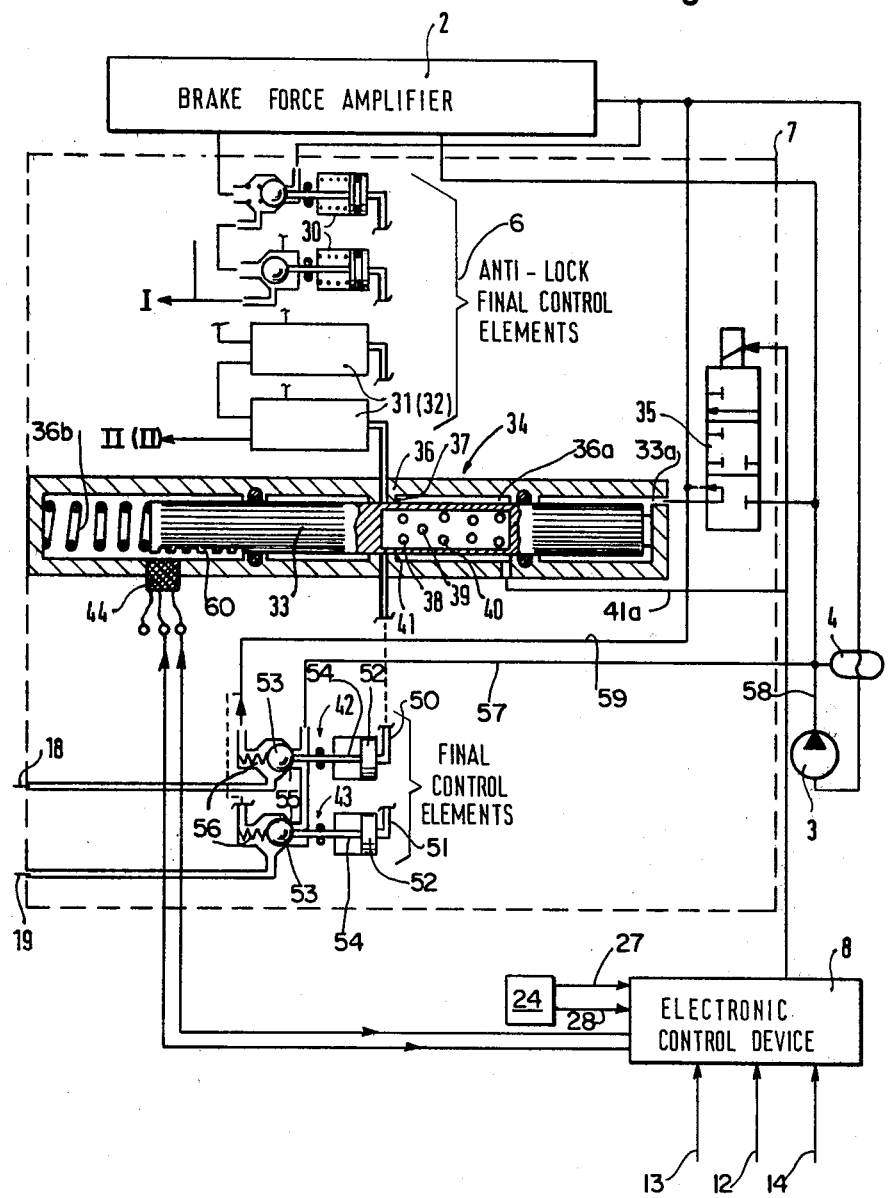
FIG. 2 shows the details of the hydraulic power steering system controls in combination with the anti-locking brake controls.

In FIG. 2, using the same reference numerals for the elements which correspond to those of FIG. 1, the internal structure of the multiple-position final valve control element 7 is shown. There, two pairs of the anti-lock final control elements 30 and 31 may be seen; a third pair 32 is located behind the pair denoted as 31. It is well known that each front wheel is controlled separately and both back wheels operate together and are operated by the same pair of anti-lock final control elements. The pair 30 is intended for the rear-axle brake circuit I and pairs 31 and 32 are intended for the front axle brake circuit II. Each pair 30, 31, 32 has one 3/2-way valve and one 2/2-way valve. The heart of the final valve control element 7 is a slide valve 34 equipped with a longitudinal slide 33. This valve is adjustable in accordance with pressure applied via a 3/3-way magnetic valve 35 to the right hand end of slide valve 34 through inlet 33a which forces the slide 33 to the left against biasing spring 36b. A sleeve member 36 has control edges 37, which cooperate with apertures 38, 39, 40 in the longitudinal slide 33 which communicates over lines extending from slide valve 34 to the right hand end of the control valves 30, 31 and 32 (FIG. 2), in order to actuate the anti-lock final control elements 30, 31, 32. Fluid pressure in the chamber 36a is obtained through a pressure line 41a is connected between the pressure chamber 36a and the output side of the pump 3. As indicated earlier the drawings of this invention are only shown schematically and this fact applies as well to the drawing of the slide 34. The sleeve member 36 has still further control edges 41 that line in a different plane from those shown at 37 and which apertures similar to 38, 39, 40 communicate over lines 50 and 51, line 51 being hid behind line 50 of FIG. 2, in order to actuate and drive final control elements 42 and 43 which in turn by lines 18, 19 provide control fluid for the steering system operating cylinder 20. Each of the control valves 42 and 43 include a piston 52 which includes a ball valve 53 on a stem 54. The ball valve is forced against valve seat 55 by biasing spring 56. The ball valve closes off the valve inlet which connects with a line 57 to the pressure line 58 from the pump 3. The control valves 42 and 43 are each provided with a fluid return line 59 that returns fluid to the reservoir. The slide valve 34 also has a position transducer 44, which is connected as shown in FIG. 2 with and drives the electronic control device 8. The slide 33 includes teeth or notches 60 positioned relative to the transducer 44 which produces a signal in accordance with the position of the slide 33. The signal is directed to the electronic control device which controls the 3/3 way magnetic valve 35 which controls the fluid to the end of slide 33. However, transducer 44 does not operate the magnetic valve 35 below a speed of 5 km/hr.

Mode of Operation

The multiple-position final valve control element 7 is supplied by the energy supply system of lines I, II of FIG. 1 of the brake system I and furnishes pressure medium for actuation of the final control elements 42 and 43 for the steering system operating cylinder 20 as described in the next preceeding paragraph (see FIG. 1).

The electronic control device 8 receives speed signals from the sensors 9, 10, 11 over lines 12, 13, 14 and receives steering signals from the transducer 24 over the electrical line 28.

A kind of hydraulic central control is created in the multiple-position final control element 7 by means of the slide valve 34, in that the slide drives various valves 30, 31, 32 as well as 42 and 43, as shown and described above and which in turn are located in various hydraulic circuits shown in FIG. 2.

If the control electronic device 8 receives a positioning command via the transducer 24, as described above, then the slide valve 34 is driven via the 3/3-way magnetic valve 35 into the corresponding position, which causes one of the two valves 42 or 43 to be driven.

If the steering wheel is moved to the right, a signal is sent to the electronic control devices which actuates the magnetic valve which controls fluid flow that moves the slide 33 to the left to align the proper aperture 38, 39, 40 with the line 50. Pressure in line 50 moves the piston 52 to the left displacing the ball 53 to permit fluid flow through line 18 to the operating cylinder 20 which moves the piston 20a in a direction to aid in moving the wheels to the right. If a signal is received from the transducer 24 for a left turn, pressure through line 51 actuates piston 52 of control element 43 to permit fluid under pressure through line 19 to the operating cylinder 20 which forces the piston 20a in the opposite direction. When the steering wheel is centered and requires no power steering the electronic control device oeprates the magnetic valve to permit fluid flow from the end of slide 33 through the magnetic valve 35 to the fluid return line 59. During operation of the power steering mechanism for parking, the speed signals from the wheel sensors and the signals from transducer 44 have no influence over the electronic control device for controlling the magnetic valve 35. Likewise above a speed of about 5 km/hr, the signals from the power steering transducer has no influence over the electronic control device for controlling the magnetic valve.

The foregoing relates to a preferred embodiment of the invention, it being understood that other embodiments and variants thereof are possible within the spirit and scope of the invention, the latter being defined by the appended claims.

What is claimed and desired to be secured Letters Patent of the United States is:

1. A hydraulic power steering parking system for motor vehicles including wheels thereon and provided with power steering means comprising a multiple-position final valve control element;

a hydraulic brake system having means connected for supplying amplified energy impulses thereof coupled to said multiple-position final valve control element, said multiple-position final valve control element having a plurality of final control elements and a slide valve for control of each of the plurality of final control elements, two of said final control elements receiving pressure medium selectively from said slide valves for actuation of the final control elements, a plurality of sensors for detecting the rotational speed of said wheels, a power steering transducer for sending out signals in accordance with the rotational position of a steering mechanism, a magnetic valve for controlling anti-lock means for the wheels, an electronic control means responsive to signals received from said plurality of sensors and said power steering transducer effective for sending signals only during predetermined speed ranges to said magnetic valve which controls by means of said slide valve one of the two final control elements, at least four of said plurality of final valve control elements constituting an anti-lock control valve means for each wheel brake, and said electronic control means, said magnetic valve and said two final control elements jointly performing control of said power steering means.

2. A hydraulic power steering parking system in accordance with claim 1 wherein said power steering transducer (24) incorporated in said power steering means is responsive to a rotational movement applied to a steering column.

3. A hydraulic power steering parking system in accordance with claim 1, which includes an operating cylinder.

4. A hydraulic power steering parking system according to claim 3, wherein said operating comprises a modified steering damper means.

5. A hydraulic power steering parking system according to claim 1, wherein said power steering parking system and said brake system are connected to a single pressure medium.

6. A hydraulic power steering parking system according to claim 5, wherein a 3/3-way magnetic valve actuates said slide valve.

7. A hydraulic power steering parking system according to claim 6, wherein said slide valve includes control edges for driving said two final control elements.

* * * * *